(12) United States Patent
Mazzarolo

(10) Patent No.: US 12,383,007 B2
(45) Date of Patent: Aug. 12, 2025

(54) METHOD FOR JOINING TOGETHER TWO PROTECTIVE MATERIALS AND PROTECTIVE GARMENT COMPRISING AN ARTICLE MADE USING THIS METHOD

(71) Applicant: Alpinestars Research S.p.A., Maser (IT)

(72) Inventor: Giovanni Mazzarolo, Coste di Maser (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 683 days.

(21) Appl. No.: 17/251,988

(22) PCT Filed: Jun. 12, 2019

(86) PCT No.: PCT/IB2019/054918
§ 371 (c)(1),
(2) Date: Dec. 14, 2020

(87) PCT Pub. No.: WO2019/239349
PCT Pub. Date: Dec. 19, 2019

(65) Prior Publication Data
US 2021/0368899 A1  Dec. 2, 2021

(30) Foreign Application Priority Data
Jun. 15, 2018 (IT) .................. 102018000006383

(51) Int. Cl.
*A41D 31/06* (2019.01)
*B32B 5/02* (2006.01)
*B32B 9/02* (2006.01)

(52) U.S. Cl.
CPC ............ *A41D 31/065* (2019.02); *B32B 5/028* (2013.01); *B32B 9/025* (2013.01);
(Continued)

(58) Field of Classification Search
None
See application file for complete search history.

(56) References Cited

U.S. PATENT DOCUMENTS 5,568,779 A * 10/1996 Wong ...................... A41D 27/24
                                                            2/125
5,874,159 A *  2/1999 Cruise ....................... B32B 7/14
                                                            428/360

(Continued)

FOREIGN PATENT DOCUMENTS

AU        199963148 A1    6/2000
CN          1960649 A     5/2007

(Continued)

OTHER PUBLICATIONS

PCT International Search Report and Written Opinion dated Sep. 19, 2019 for Intl. App. No. PCT/IB2019/054918, from which the instant application is based, 10 pgs.

*Primary Examiner* — Jacob T Minskey
*Assistant Examiner* — Caroline Beha
(74) *Attorney, Agent, or Firm* — Fredrikson & Byron, P.A.

(57) ABSTRACT

The present invention relates to a method for joining a first protective material (10) together with a second protective material (20) consisting of a thermally insulating fabric having a mesh configuration. The method comprises the steps of: providing a plurality of separate gluing points (30) on an inner surface (14) of the first protective material (10); hot-pressing the second protective material (20) onto the first protective material (10), in order to melt the plurality of separate gluing points (30), so as to firmly fix the second protective material (20) to the first protective material (10). The present invention relates furthermore to a protective (Continued)

garment, in particular for motorcyclists, comprising an article made using this method.

14 Claims, 3 Drawing Sheets

(52) U.S. Cl.
CPC ...... *A41D 2400/10* (2013.01); *A41D 2500/00* (2013.01); *B32B 2250/02* (2013.01); *B32B 2307/304* (2013.01); *B32B 2437/00* (2013.01)

(56) References Cited

U.S. PATENT DOCUMENTS

| | | |
|---|---|---|
| 2007/0218792 A1 | 9/2007 | Walters |
| 2011/0088282 A1* | 4/2011 | Dojan .................. B29D 35/148 12/146 C |
| 2013/0171407 A1* | 7/2013 | Franzoi ................ G10K 11/172 428/116 |
| 2017/0251734 A1* | 9/2017 | Hurren ...................... B32B 7/12 |
| 2019/0309173 A1* | 10/2019 | Lu .......................... C09D 133/02 |

FOREIGN PATENT DOCUMENTS

| | | | |
|---|---|---|---|
| EP | 1056595 A2 | 12/2000 | |
| EP | 1056595 B1 * | 3/2004 | ............. A41D 31/02 |
| EP | 2207438 A1 | 7/2010 | |

\* cited by examiner

METHOD FOR JOINING TOGETHER TWO PROTECTIVE MATERIALS AND PROTECTIVE GARMENT COMPRISING AN ARTICLE MADE USING THIS METHOD

Related Applications

This application is a 35 U.S.C. 371 national stage filing from International Application No. PCT/IB2019/054918, filed Jun. 12, 2019, which claims priority to Italian Application No. 102018000006383, filed Jun. 15, 2018, the teachings of which are incorporated herein by reference.

The present invention relates to a method for joining a first protective material together with a second protective material. In particular, the present invention relates to a method for joining a protective material, such as natural leather or a similar material, together with a thermally insulating fabric having a mesh configuration.

The present invention relates furthermore to a protective garment, in particular for motorcyclists, comprising an article made using this method.

The riders of two-wheeled vehicles, such as scooters or motorcycles, usually wear protective garments made generally of natural leather or imitation leather.

Leather in fact provides good protection against abrasion and atmospheric agents, such as the wind and rain, and also ensures a suitably degree of breathability.

However, in the event of sliding along the road surface, the friction between the ground and garment generates, irrespective as to whether the garment is torn or not, a considerable amount of heat which causes overheating of the outer surface of the garment.

This heat may be transmitted to the rider's skin, causing inflammation and burns.

In order to reduce the thermal conductivity it is known to combine the leather with thermally insulating fabrics which are able to offer an additional protection against abrasion, such as Kevlar®.

EP 2207438 and AU 19996318 describe an article of clothing made of leather, on the inner side of which a plurality of panels made of abrasion-resistant and thermally insulating fabric are fixed by means of stitching.

These solutions, although considered to be valid, are not without drawbacks.

Firstly, in the event of sliding, the stitches constitute the weak point of a jacket or a suit since they tend to tear before the leather. Therefore, they must be made using special yarns, for example double-twisted nylon yarns.

Moreover, the provision of stitches negatively affects the appearance of the final garment since they remain visible.

Furthermore, the stitches are generally arranged along the perimeter of the single panels and this has the effect that the panels are unable to adhere perfectly to the outer fabric. The garment thus formed, as a whole, may have irregular thicknesses, to the detriment of the comfort and the aerodynamic form of the person wearing it.

Finally, the method of fixing by means of stitches is relatively slow and requires the execution by highly specialized labour.

It is also known to join natural leather together with an abrasion-resistant fabric by means of gluing.

However, joining together of the fabric and leather is performed by means of continuous polymer films which on the one hand allow the use of stitching to be dispensed with, but on the other hand negatively affect the breathability of the leather.

Moreover, the provision of these continuous polymer films stiffens the assembly formed by the leather and the underlying fabric and therefore reduces the comfort of the garment as a whole.

The object of the present invention is to provide a method for joining a first protective material, such as natural leather or similar material, together with a thermally insulating fabric, which is able to overcome, or at least limit, the drawbacks described with reference to the prior art.

In particular, a task of the present invention is to provide a method for joining a first protective material together with a thermally insulating fabric so that the thermally insulating fabric is fixed firmly and securely to the second protective material, without negatively affecting the breathability of the first protective material.

Another task of the present invention is to provide a method for joining a first protective material together with a thermally insulating fabric, so that the article obtained has regular and constant thicknesses.

A further task of the present invention is to provide a method for joining a first protective material together with a thermally insulating fabric so that the appearance of the first protective material is not negatively affected.

Furthermore, a task of the present invention is to provide a method for joining a first protective material together with a thermally insulating fabric in a simple and quick manner without having to use specialized labour.

Finally, a task of the present invention is to provide a protective garment which, while offering a better level of protection, has a pleasing appearance and is extremely comfortable.

The object and the main tasks described above are achieved with a method and with a protective garment, each according to the claims herein.

The characteristic features and further advantages of the invention will emerge from the description, provided hereinbelow, of a number of examples of embodiment, provided by way of a non-limiting illustration, with reference to the accompanying drawings in which.

Figure 1:
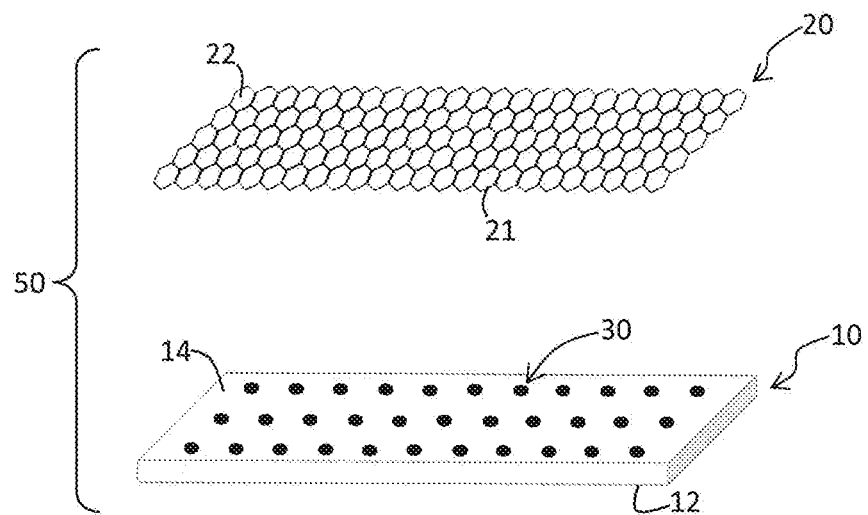
FIG. 1 shows a schematic view of a step of the method according to the invention.

With reference firstly to FIGS. 1-5, the present invention relates to a method for joining together a first protective material 10 together with a second protective material 20. The first protective material 10 has an outer surface 12, intended to remain visible, and an inner surface 14, opposite to the outer surface 12. The first protective material 10 is preferably made using an abrasion-resistant material, in particular natural leather, for example bovine leather or kangaroo leather, or similar material.

In the case where the first protective material 10 is made of natural leather or similar material, the outer surface 12 is the so-called "top side", while the inner surface 14 is the so-called "skin side" of the leather.

Preferably, the first protective material 10 has a thickness of between 1 and 1.5 mm.

The second protective material 20 is made, in turn, of a thermally insulating fabric and has a mesh or loose weave configuration.

For the purposes of the present invention "mesh or loose-weave configuration" is understood as meaning that between the longitudinal and transverse yarns which form the fabric there are channels or openings 22 which extend transversely along the material so as to allow the air to pass through it. Consequently, the second protective material 20, while keeping substantially unchanged its thermal insulation properties, is at the same time breathable.

Advantageously, the second protective material 20 may be made using a fabric which, in addition to being thermally insulating, is also abrasion-resistant. Preferably, the second protective material 20 is made using aramid fibres, in particular Kevlar®.

Preferably, the thickness of the second protective material is between 1 and 1.5 mm.

With specific reference to FIG. 1, in accordance with the invention, the method comprises a first step in which a plurality of separate gluing points 30, formed by small clusters of glue, is arranged on the inner surface 14 of the first protective material 10.

Preferably, said plurality of separate gluing points 30 is formed by small clusters of adhesive which can be activated by heat (hot-melt adhesive). This plurality of separate gluing points 30, as will be explained below, allows adhesion between the first protective material 10 and the second protective material 20 without detriment to the breathability of the second protective material 20, i.e. the thermally insulating fabric.

The plurality of separate gluing points 30 may be arranged on the inner surface 14 of the first protective material 10 by means of a glue feeding device (not shown in the figures since well-known to a person skilled in the art) which can be controlled manually or by means of a programmable control unit.

Figure 2:
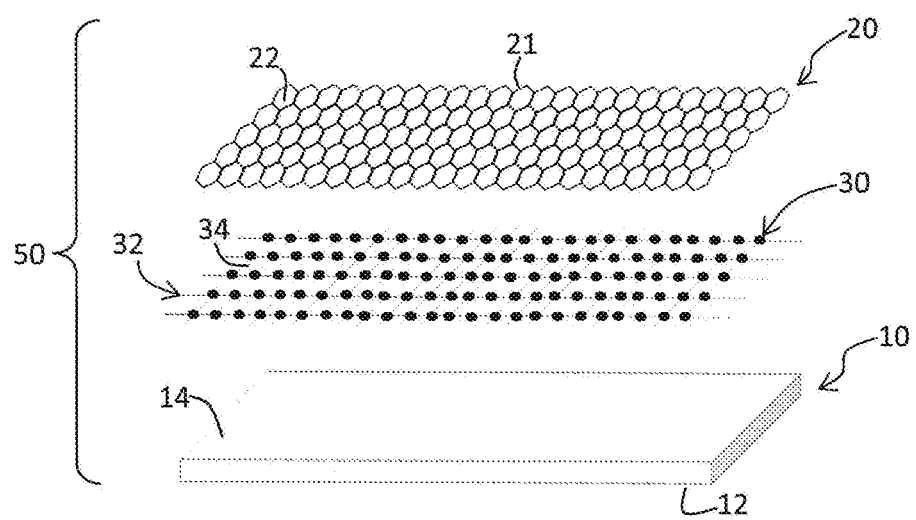
FIG. 2 shows a view, similar to that of FIG. 1, but relating to a different embodiment of the method according to the invention.

In an alternative embodiment, shown in FIG. 2, the plurality of separate gluing points 30 is arranged on a support layer 32 configured to be placed between the inner surface 14 of the first protective material 10 and the opposite surface of the second protective material 20. For example, the support layer 32 may be a sheet of breathable paper or may be made using a breathable non-woven fabric.

The gluing points may be arranged on both sides of the support layer or may be provided so that the glue arranged on one side of the support layer impregnates said layer and passes through to the opposite side.

Once placed between the first protective material and the second protective material, the support layer 32 on which the gluing points 30 are arranged therefore allows adhesion between the first protective material and the second protective material.

As can be clearly seen in FIG. 2, the support layer 32 may also advantageously have a mesh or a loose-weave configuration. For the purposes of the present invention, with mesh or loose-weave configuration of the support layer 32, in a manner similar to that described with reference to the second protective material 20, it is understood that between the filaments which form the support layer 32 there are channels or openings 34 which extend transversely along the support layer so as to allow the passage of air through it.

Figure 3:
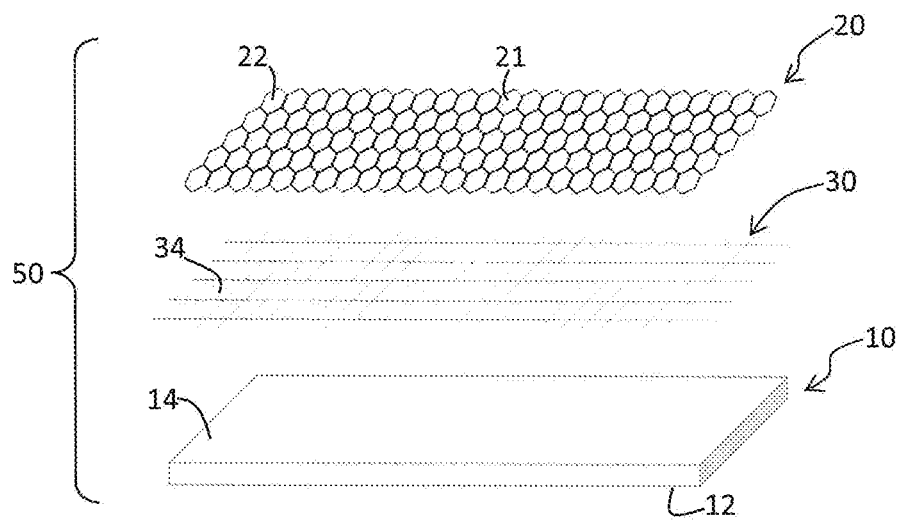
FIG. 3 shows a view, similar to that of FIG. 1, but relating to a further embodiment of the method according to the invention.

With reference to FIG. 3, the plurality of separate gluing points may be integrated in the support layer with a mesh configuration. For the purposes of the present invention "integrated in the support layer" is to be understood as meaning that the plurality of separate gluing points forms a single body with the support layer and more particularly that the gluing points are embedded in the support layer. In this case said support layer is identified by means of the reference number 30.

Advantageously, the support layer 30 may be soaked with glue.

Alternatively, the support layer 30 may be formed directly by the glue, for example a solvent-based or water-based glue.

In particular, the mesh support layer may be made with polyamide glue having a low melting point, for example between 75° C. and 90° C., even more preferably between 80° C. and 85° C.

As already mentioned, after arranging the plurality of separate gluing points 30, or the support layer 30 with the plurality of separate gluing points, on the inner surface 14 of the first protective material 10, the second protective material 20 is hot-pressed onto the first protective material 10.

Figure 4:
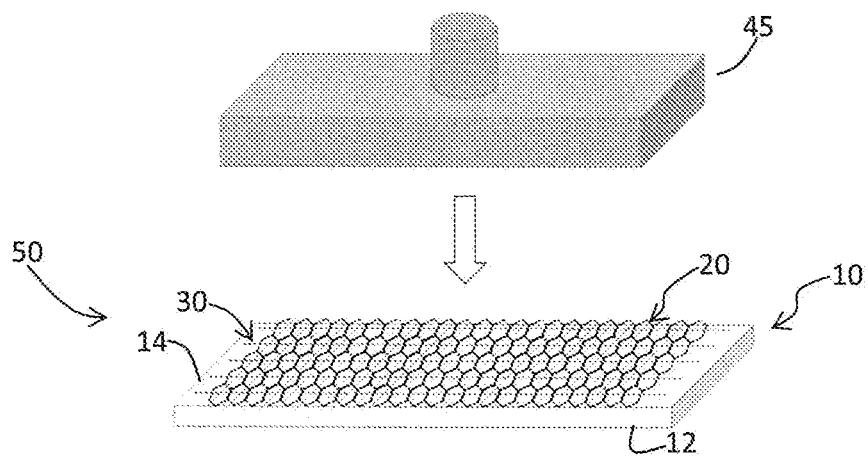
FIG. 4 shows a schematic view of a further step of the method according to the invention.

With reference to FIG. 4, this pressing operation may be performed simply by means of a normal hot-pressing operation.

Preferably, the hot-pressing step is performed at a temperature higher than the melting point of the plurality of gluing points 30 which are separate or form part of the support layer, so as to allow gluing and adhesion between the first protective material and the second protective material. The temperature is set so as to be higher than the melting temperature of the gluing points since the presence of the second thermally insulating material acts as a heat insulant also during this process step.

For example, in the case where glues with a low melting point are used, the hot-pressing operation may be performed at a temperature of about 130° C. so as to ensure gluing and at the same time not damage the first protective material, in particular if it consists of natural leather.

The hot-pressing operation is preferably performed for a time period of between 40 and 60 seconds; even more preferably for a time period of about 50 seconds. This time period ensures that all the gluing points 30 or the support layer at the end of the pressing operation is/are completely melted, without the surface of the first protective material being damaged. Preferably, the hot-pressing operation is performed at a pressure of between 2 and 4 bar, in particular 3 bar.

At the end of the hot-pressing operation an article 50 with a triple layer structure is therefore obtained (see FIG. 5): an outer layer formed by the first protective material 10, an intermediate layer formed by the plurality of gluing points and/or by the support layer 30 and an inner layer formed by the second protective material 20.

Figure 5:
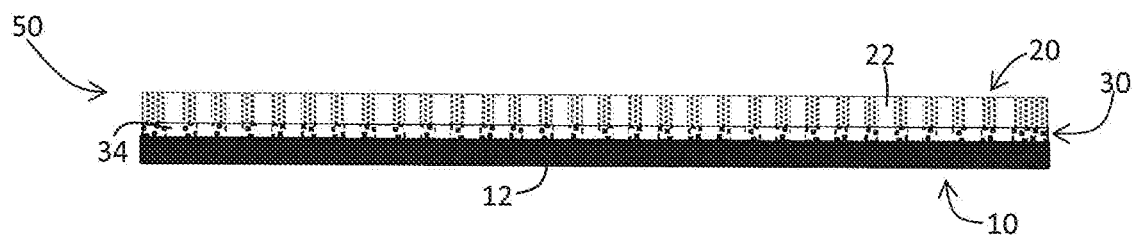
FIG. 5 shows a schematic cross-sectional view of the article obtained by means of the method according to the present invention.

As can be clearly seen in FIG. 5, the special feature of joining together with the first protective material 10 a second protective material 20 having a mesh configuration, by means of separate gluing points or by means of a support layer also with a mesh configuration, results in an article 50 which remains as a whole breathable.

The channels or the openings 22 of the second protective material are preferably intended to coincide with the portions of the first protective material in which there are no separate gluing points or, in the case where there is a mesh support layer 30, with the openings or the channels 34 of the mesh support layer 30.

In the case where the article 50 produced with the method according to the invention is used in an article of clothing, the configuration of the second protective material 20 allows the latter to be passed through by any water vapour produced by body sweating. In the case where the first protective material 10 is made of natural leather, said water vapour may therefore be advantageously dispersed externally, ensuring a high degree of comfort for the user.

Figure 6:
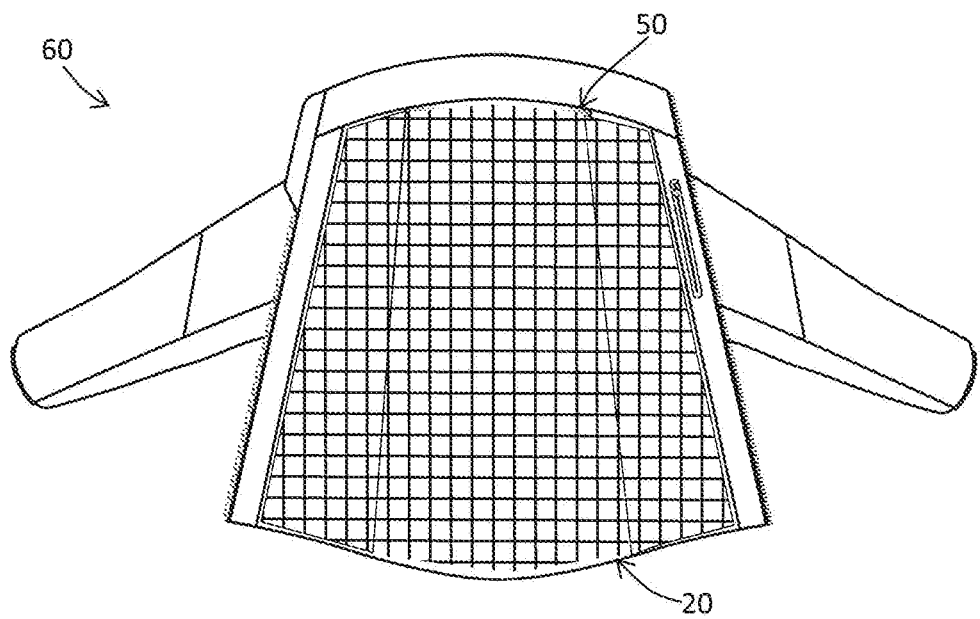
FIG. 6 shows a schematic view of a protective garment, in an open configuration, comprising an article made using the method according to the present invention.

FIG. 6 shows, in an open configuration, a protective garment 60 comprising an article 50 made using the method according to the invention.

In particular, the back portion of the garment 60 may be made of natural leather or similar material, and a thermally insulating fabric 20 with a mesh configuration may be applied onto the inner surface of this portion, in the manner described above.

In the case where the thermally insulating fabric is made of Kevlar® with a thermal conductivity of 0.043 W/m*K it was possible to observe how, by joining this fabric together with the outer leather of the garment, an increase of about 40% in the impact abrasion resistance and a reduction of about 60% in the thermal conductivity of the garment may be obtained, without negatively affecting in any way the breathability of the garment. The abrasion resistance of the article according to the invention was tested in accordance with the standard UNI EN 13595-1:2004 using P60 sandpaper.

It was noted that the abrasion resistance of a leather layer without the thermally insulating fabric lies within the range of 6-8 seconds, with an average value 6.66 seconds. The abrasion resistance of the article according to the invention, in which a layer of thermally insulating material made of Kevlar was joined together with the same leather layer, lies within the range of 9-11 seconds, with an average value of 9.46 sec.

The thermal conductivity of the article according to the invention was tested in accordance with the standard UNI EN ISO 12127-1:2016 at a contact temperature of 80° C. It was noted that the contact heat resistance of a leather layer without the thermally insulating fabric lies within the range of 40-43 seconds, with an average value of 41.4 seconds. The contact heat resistance of the same leather layer, joined together with a layer of thermally insulating material made of Kevlar according to the method of the present invention, lies within the range of 67-70 seconds, with an average value of 68.7 seconds.

In the event of sliding along asphalt, the risk of the garment being torn is therefore reduced and the risk that the user may suffer burns due to the heat produced by the friction between ground and garment is reduced to an even greater degree.

FIG. 6 shows a jacket, but also other types of garments, such as trousers, suits or jumpers, may also be devised so as to comprise articles made using the method according to the present invention.

From the above description, it is now clear how with the method and the garment according to the present invention the predefined objects may be advantageously achieved.

In particular, with the method according to the present invention it is possible to join a protective material, such as leather, to a thermally insulating fabric in a stable and safe manner, without adversely affecting the breathability of the leather. As a result of the mesh structure of the thermally insulating fabric, an article which as a whole is breathable may be obtained.

Moreover, the article obtained has uniform and constant thicknesses. In fact, the thermally insulating fabric is no longer fixed only along its perimetral edge. It adheres to the outer leather over its whole area, thus ensuring a high grip and preventing the formation of wrinkles or folds along its central portion.

Furthermore, with the method according to the present invention, the arrangement of stitches between the first protective material and second protective material may be eliminated, thereby improving the appearance of end garment.

Also the hot-pressing operation by means of which the first protective material and second protective material are joined together is simple to carry out and, in addition to being quick, may also be performed by non-specialized labour.

Finally, the garment obtained using articles made using the method according to the present invention ensures an improved comfort for the user and at the same time offers improved protection against impacts and against any burns due to friction.

Obviously, the above description of an embodiment applying the innovative principles of the present invention is provided by way of example of these innovative principles and must therefore not be regarded as limiting the scope of the rights claimed herein.

For example, the characteristic features of the various solutions shown here may be combined with each other according to specific needs and wishes.

Finally, exact forms and proportions of the various parts may vary depending on the specific practical requirements.

The invention claimed is:

1. A method for joining a first protective material having an outer surface, designed to remain visible, and an inner surface, opposite to said outer surface, together with a second protective material, made of a thermally insulating fabric, said second protective material having a mesh configuration, which method comprises the following steps:
   providing a plurality of separate gluing points, formed by small clusters of glue, on said inner surface of the first protective material;
   hot-pressing the second protective material onto said first protective material in order to melt said plurality of separate gluing points arranged on said first protective material, so as to firmly fix, by means of said plurality of separate gluing points, the second protective material to the first protective material;
   wherein the first protective material is breathable and made of natural or imitation leather and the second protective material with a mesh configuration is made using a thermally insulating and abrasion-resistant fabric, the second protective material with the mesh configuration being formed by aramid fibres;
   wherein the plurality of separate gluing points is arranged on a support layer having a mesh configuration or made with a breathable material; and
   wherein the second protective material and gluing layer made of the plurality of separate gluing points permit to maintain breathability of an entirety of the first protective material, the second protective material, and gluing layer as collectively joined.

2. The method as claimed in claim 1, characterized in that said plurality of separate gluing points is placed between the inner surface of the first protective material and an opposite surface of the second protective material.

3. The method as claimed in claim 2, characterized in that said support layer has the mesh configuration and in that said plurality of separate gluing points is integrated in said mesh.

4. The method as claimed in claim 3, characterized in that the support layer is soaked with glue.

5. The method as claimed in claim 3, characterized in that the support layer is formed by glue.

6. The method as claimed in claim 5, characterized in that the support layer is made with a polyamide glue having a melting point of between 75° C. and 90° C.

7. The method as claimed in claim 1, characterized in that the hot-pressing step is performed at a temperature which is substantially the same as the melting point of said plurality of separate gluing points.

8. The method as claimed in claim 1, characterized in that the hot-pressing step is performed at a pressure of between 2 and 4 bar.

9. The method as claimed in claim 1, characterized in that said hot-pressing step is performed for a time period of between 40 and 60 seconds.

10. The method as claimed in claim 6, characterized in that the support layer is made with a polyamide glue having a melting point of between 80° C. and 85° C.

11. The method as claimed in claim 7, characterized in that the hot-pressing step is performed at a temperature which is substantially the same as the melting point of a support layer.

12. The method as claimed in claim 1, characterized in that the first protective material is made of bovine leather or kangaroo leather, or a similar material.

13. A protective garment comprising a first protective material having an outer surface, designed to remain visible, and an inner surface, opposite to said outer surface, and a second protective material, made of a thermally insulating fabric, said second protective material having a mesh configuration, the second protective material joined to the first protective material by means of a plurality of separate gluing points, formed by small clusters of glue, wherein the first protective material is breathable and made of natural or imitation leather and the second protective material with a mesh configuration is made using a thermally insulating and abrasion-resistant fabric, the second protective material with the mesh configuration being formed by aramid fibres; wherein the plurality of separate gluing points is arranged on a support layer having a mesh configuration or made with a breathable material; and wherein the second protective material and gluing layer made of the plurality of separate gluing points permit to maintain breathability of an entirety of the first protective material, the second protective material, and gluing layer as collectively joined.

14. The protective garment as claimed in claim 13, wherein the garment is a motorcyclist's garment.

* * * * *